Dec. 28, 1954  M. B. BIRO ET AL  2,698,187
SEAT PROPELLED VEHICLE
Filed March 28, 1952  3 Sheets-Sheet 1
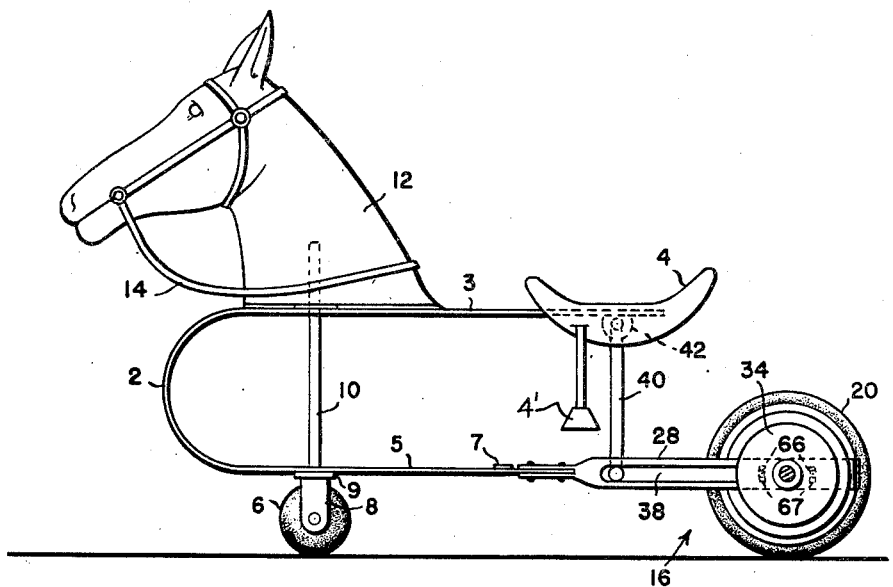
FIG. 1.
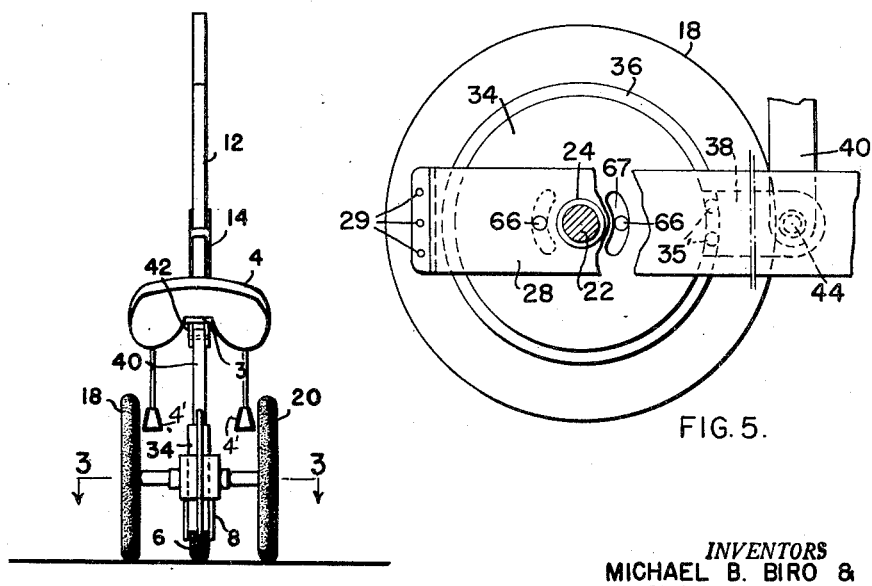
FIG. 2.
FIG. 5.
INVENTORS
MICHAEL B. BIRO &
CHARLES B. BIRO
BY
ATTORNEYS Dec. 28, 1954    M. B. BIRO ET AL    2,698,187
SEAT PROPELLED VEHICLE Filed March 28, 1952    3 Sheets-Sheet 3

INVENTORS
MICHAEL B. BIRO &
CHARLES B. BIRO
BY

ATTORNEYS

United States Patent Office 2,698,187
Patented Dec. 28, 1954

2,698,187
SEAT PROPELLED VEHICLE

Michael B. Biro, Long Island City, and Charles B. Biro, New York, N. Y.

Application March 28, 1952, Serial No. 279,194

5 Claims. (Cl. 280—226)

This invention relates to a rider propelled vehicle and, more particularly, to a tricycle in the nature of a hobby-horse on which a youthful rider may, by bouncing upwardly and downwardly, cause the tricycle to be propelled forward.

While rider propelled vehicles have been heretofore disclosed in various forms, such vehicles generally provide a rigid mechanical connection between parts movable by the rider and the driving wheel or wheels.

It is an object of this invention to provide, in a simple and practical form, a child's toy which, while simulating a pony or a bucking bronco, may be propelled by the rider.

It is a further object of this invention to provide a rider propelled vehicle in which energy provided by motion of the rider's body is stored in an energy storing apparatus and, simultaneously, energy from the energy storing apparatus is delivered to the wheels of the vehicle and applied thereto as the vehicle is propelled forwardly by the energy thus applied.

It should be particularly noted that, by virtue of the fact that energy may be accumulated in a storage unit, the vehicle may be satisfactorily operated by a child whose strength might be insufficient or whose muscular coordination might be inadequate to propel a vehicle in which the means movable by the rider is directly and rigidly connected to the vehicle driving wheels.

These and other objects of the invention will become apparent from the following description when read in conjunction with the accompanying drawings, in which:

Figure 1 is a partially cut away elevation of the vehicle;

Figure 2 is a rear elevation of the vehicle;

Figure 5 is a fragmentary elevation of a portion of the apparatus shown in Figure 3 as viewed from the right-hand side of Figure 3.

Figure 3:
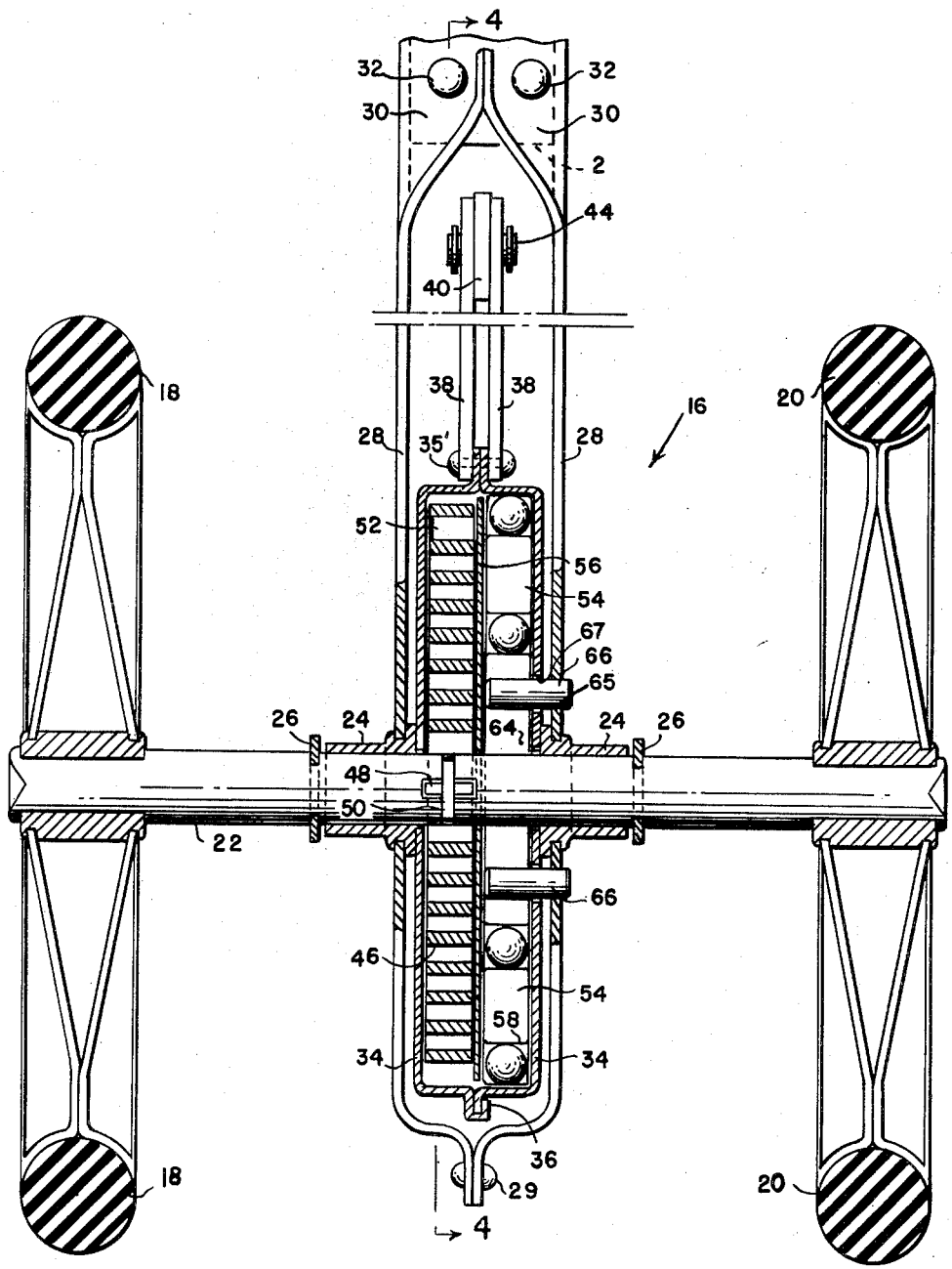
Figure 3 is a transverse section through the rear wheel and energy storage apparatus taken on the plane 3—3 shown in Figure 2.

The vehicle, as indicated in the drawings, is a tricycle and comprises a U-shaped member 2 having an upper arm 3 and a lower arm 5. The member is preferably formed from a strip of spring steel. The loop of the U is positioned forwardly of the vehicle and a seat 4 to accommodate the rider is mounted on the outer end of the upper arm 3 of the U. Supporting the forward end of the U is a single wheel 6 mounted on a shaft passing through a yoke 8 which is affixed to a rotatable vertical post 10 passing upwardly through suitable bores in the lower and upper arm of the U-shaped member 2. The yoke 8 is provided at its upper end with a flange 9 which is adapted to support the forward end of the lower arm 5 of the U-shaped member.

Affixed to the upper end of the vertical post 10 may be, for example, a horse's head 12 as indicated in the drawing. It will be evident, however, that the horse's head may be replaced by any suitable representation attractive to a juvenile rider. The horse's head is provided with reins 14 which may be held by a rider seated in the seat or saddle 4 and by means of which the rider may turn the forward wheel 6 of the vehicle in order to steer the vehicle when in motion.

Figure 4:
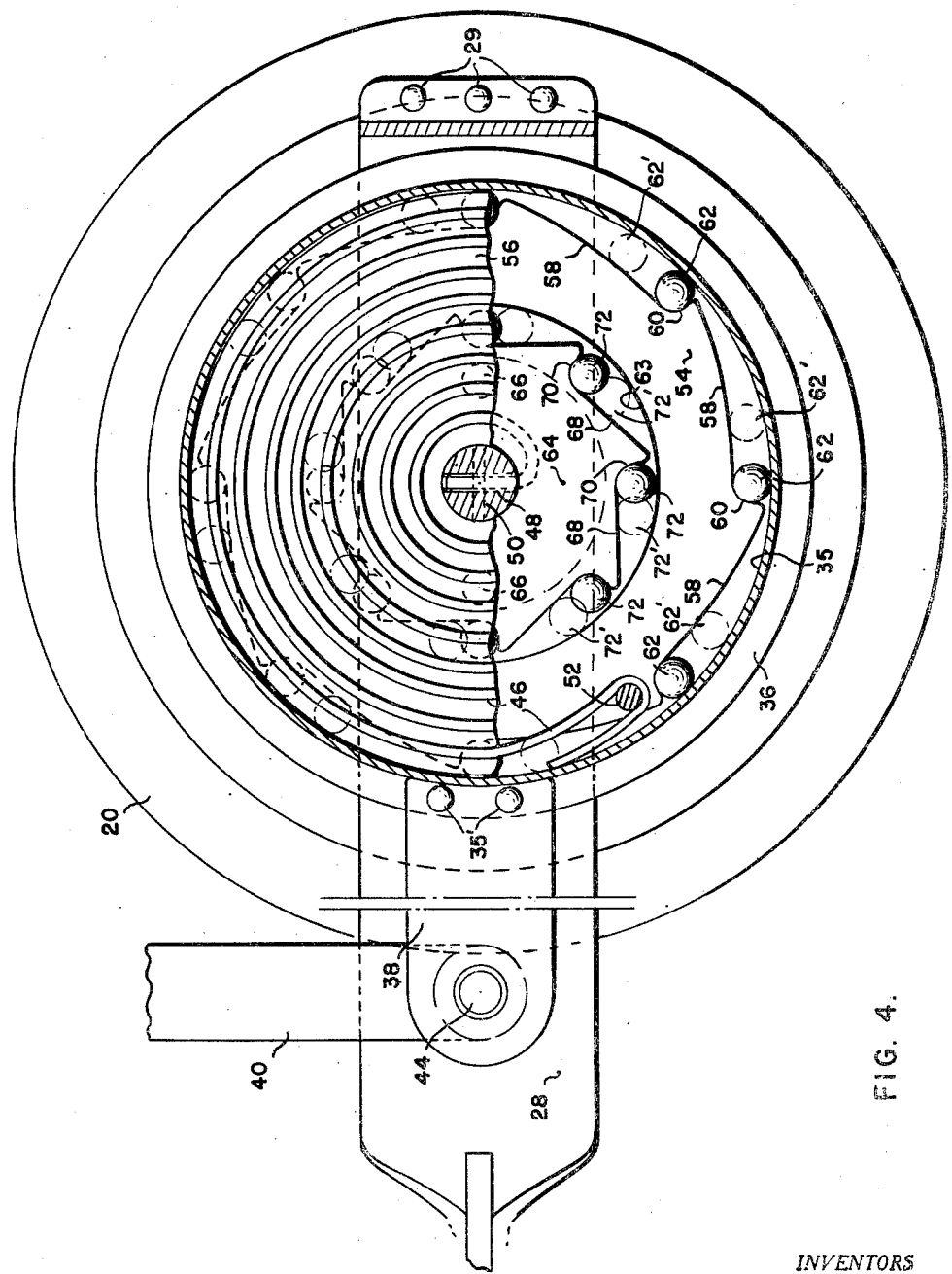
Figure 4 is a cut away view of the energy storage apparatus taken on the plane 4—4 indicated in Figure 3.

Attached to the rear end of the lower arm 5 of the U-shaped member 2 is the propulsion unit indicated generally at 16 in Figure 1 and shown in greater detail in Figures 3 and 4.

The two rear wheels of the vehicle 18 and 20 are mounted on an axle 22. One or both of the rear wheels may be rigidly connected to and in driven relation with the axle. The axle passes through a pair of bushings 24 which are held in alignment therewith by means of conventional clip rings 26 fitted into grooves in the axle. Each of the bushings 24 is mounted in a horizontally extending strap 28. The forward ends 30 of each of the straps 28 are formed into U-shapes of such dimensions as to receive the outer end of the lower arm 5 of the U-shaped spring member 2. The straps 28 and the member 2 are joined together by means of rivets or other suitable fastening means indicated at 32. The rear ends of the straps 28 are formed to engage each other and are held together by rivets 29.

Mounted between the straps 28 are a pair of engaging shallow cup-shaped flanged retainers 34. These retainers may be joined together by crimped circumferential flanges as indicated at 36. Each of the retainers is provided with a radially central bore through which the axle 22 is passed. A pair of plates 38 are affixed to the circumferential flanges 36 of the cup-shaped members 34 at the forwardmost portion thereof by rivets 35'.

A connecting rod 40 is pivotally mounted to the upper arm 3 of the U-shaped spring member 2 by means of a suitable clevis and pin 42. The lower end of the connecting rod 40 passes between the plates 38 and is pivoted thereto by means of a pin 44. Thus, as the rider causes the seat 4 to move upwardly and downwardly, the connecting rod 40 acting through the plates 38 cause the retainers 34 to rotate in an oscillatory manner around the axle 22.

The energy storing means is enclosed within the retainers 34 and includes a coiled leaf spring 46, the inner end of which passes through a slot 48 in the axle 22 and is locked in position therein by means of a pin 50 passing through both the end of the leaf spring and the axle 22. The outer end of the leaf spring 46 is hooked over a pin 52 mounted in an annular member 54 which is positioned within the retainers 34 beside the spring 46 and separated therefrom by means of a spacer plate 56, the spacer plate 56 being provided with a suitable bore to permit the passage of the pin 52.

The outer peripheral surface of the annular member 54 is formed with a plurality of cam surfaces 58, the adjacent surfaces 58 being joined in the regions 60 by a surface generally radially disposed. The space thus provided between each of the cam surfaces 58 and the rim 35 of one of the retainers 34 is of substantially the same width, as shown in Figure 3, as radial depth, as shown in Figure 4. The space is thus adapted to conveniently receive a ball member 62 which is of diameter slightly less than the maximum radial space provided between the cam surfaces 58 and the rim 35. The inner circumferential surface 63 of the annular member 54 is of smooth cylindrical form.

The annular member 64 is positioned within the annular member 54 and is provided with a central bore through which the axle 22 is passed, the axle being free to rotate therein. The annular member 64 is mounted on pins 66 which extend through slots 67 in one of the retainers 34 and into bores 65 in one of the frame straps 28. Thus rotation of the annular member 64 with respect to the frame straps 28 is prevented while the slots 67 permit a limited rotation of the retainers 34 with respect to the frame straps 28. The outer peripheral surface of the member 64 is provided with a plurality of cam surfaces 68 similar in formation to the surfaces 58 of the annular member 54. The cam surfaces 68 of the member 64 are joined by generally radial surfaces 70. Balls 72 are placed in the spaces provided between the cam surfaces 68 of the member 64 and the smooth inner circumferential surface 63 of the annular member 54.

In order to propel the device in a forward direction, the rider will seat himself upon the saddle 4. His weight thus placed upon the U-shaped spring member 2 will cause the upper arm 3 thereof to be depressed. The rider grasping the reins and placing his toes in the conveniently arranged stirrups 4' can, by either alternately standing in the stirrups and allowing his weight to fall upon the saddle or by rocking his body forwardly and backwardly thus altering the load upon the upper arm 3 of the U-shaped spring 2, or by a combination of these motions, cause the saddle to move upwardly and downwardly. Alternately, the rider can place his feet upon the cross bar 7 affixed to and extending transversely of the lower arm 5 and, by successively standing and sitting, cause the seat to move upwardly and downwardly.

This driving motion will move the vertical connecting rod 40 and the horizontal connecting plates 38 upwardly and downwardly. When the connecting plates 38 are moved downwardly from the position shown in Figure 4, the rim 35 and the balls 62 will be moved in a counterclockwise direction. The balls are free to move until they jam between the surfaces 35 and 58 as indicated in the construction line positions 62'. The balls in these positions will jam between the adjacent surfaces and cause the annular member 54 to be rotated in a counterclockwise direction as the retainers 34 are rotated as a result of downward motion of the connecting rod 40 and the saddle 4.

After the rider's body has reached a lowermost position, such as is determined by either his weight and his initial downward velocity or by the degree of motion of the retainers 34 permitted by the movement of the slots 67 with respect to the stationary pins 66 and the rider is bouncing upwardly and preferably leaning in a forward direction to reduce the moment about the forwardly curved portion about the spring member 2, the upper arm 3 of the spring member 2 will rise upwardly carrying with it the connecting rod 40 and the connecting plates 38, thus rotating the retainers 34 in a clockwise direction as viewed in Figure 4.

As the outer surface 35 of the retainers 34 is rotated in a clockwise direction, the balls 62 will be also carried in a clockwise direction until they engage the substantially radial surfaces 60 of the annular member 54, and thereafter the surface 35 is free to rotate in a clockwise direction while the annular member 54 remains stationary.

When the retainers begin a period of clockwise rotation, the annular member 54 will rotate in a clockwise direction to the degree necessary to carry the balls 72 into locking engagement between the surfaces 68 of the stationary inner member and the inner surface 63 of the annular member 54 as shown at 72'. As soon as this locking action is accomplished rotation of the annular member 54 will be arrested and, for the duration of the rider's upward motion and the accompanying clockwise direction of the surface 35, the member 54 will be stationary. When the rider has achieved an uppermost position and the upper arm 3 of the U-shaped spring member 2 has reached its uppermost position, the arm 3 will again descend and, through the connecting rod 40 and the connecting plates 38, counterclockwise motion will be again imparted to the surface 35. It will be evident from the foregoing that during each period of downward motion of the rider, the annular member 54 will be rotated in a counterclockwise direction and, during each period of upward motion of the rider, the annular member 54 will be retained in a stationary position. Thus repeated upward and downward motion of the rider will cause the spring member 46 to be wound around the axle 22 as a result of the pin 52 affixed to the annular member 54 pulling the outer end of the spring in a counterclockwise direction.

The inner end of the spring 46 is rigidly affixed to the axle 22 which is rotatably mounted in the bearings 24 and to which the rear wheels 18 and 20 are rigidly connected. Thus the energy stored in the spring 46 will exert a torque upon the axle 22, the effect of which will be to cause the wheels to rotate in a forward direction and thus propel the vehicle. It will be evident that the more violently the rider bounces in the saddle 4, i. e., the greater the depths and the heights to which he bounces, the greater will be the amount of energy stored in the spring 46 over a given period of time and thus the greater will be the torque applied to the rear wheels by the inner end of the energy storing spring 46.

While the preferred embodiment has been shown, it will be evident that various modifications may be made to the embodiment without departing from the scope of the invention as set forth in the following claims.

What is claimed is:

1. A rider propelled vehicle comprising front and rear wheels, an axle mounting the rear wheels and in driving relation with at least one of the rear wheels, a seat for the rider, yielding means supporting the seat upon the wheels, and energy storing means, the energy storing means including a housing rotatably mounted on the rear axle, means responsive to oscillatory movement of the seat supporting the rider for oscillating the housing around the rear axle, a pair of annularly arranged annular members retained within the housing, means preventing rotation of the inner of the annular members, a spiral spring retained within the housing, the outer end of the spiral spring being affixed to the outer of the annular members and the inner end of the spiral spring being affixed to the rear axle, the outer surface of the outer annular member being provided with peripherally arranged cam surfaces, a set of floating members adapted to be engaged between the inside peripheral surface of the housing and the peripherally arranged cam surfaces of the outer annular member when the housing is rotated in one direction about the axis and to be disengaged therefrom when the housing is rotated in the other direction about the axis, thus causing the outer annular member to rotate when the housing is rotated in one direction and permitting the outer annular member to be stationary when the housing is rotated in the opposite direction, the inner peripheral surface of the outer annular member and the outer peripheral surface of the inner annular member presenting peripherally arranged cam surfaces with respect to each other, a second set of floating members adapted to be engaged between the adjacent cam surfaces of the inner and outer annular members when the outer member is rotated in one direction with respect to the inner member and to be disengaged therefrom when the outer annular member is rotated in the opposite direction about the inner annular member, the direction in which the outer annular member may rotate freely with respect to the inner annular member being the same direction in which the outer annular member is moved by the housing through the first set of floating members, the spiral spring thus being wound by rotation of the outer annular member resulting from oscillatory movement of the seat supporting the rider and the vehicle being driven by energy imparted to at least one of the rear wheels through the axle from the spiral spring.

2. A rider propelled vehicle comprising front and rear wheels, an axle mounting the rear wheels and in driving relation with at least one of the rear wheels, a seat for the rider, yielding means supporting the seat upon the wheels, and energy storing means, the energy storing means including a housing rotatably mounted on the rear axle, a spiral spring mounted within the housing, the inner end of the spiral spring being connected to the axle, ratchet means within the housing, the outer end of the spiral spring being connected to the ratchet means, and means responsive to oscillatory movement of the seat supporting the rider for oscillating the housing around the rear axle, the ratchet means acting in conjunction with the housing to wind the spring in one direction from the outer end thereof as the housing rotates in one direction and to prevent unwinding of the spring when the housing is stationary or rotating in the opposite direction, the vehicle being driven by energy imparted to at least one of the rear wheels through the axle from the spiral spring.

3. A rider propelled vehicle comprising front and rear wheels, an axle mounting the rear wheels and in driving relation with at least one of the rear wheels, a seat for the rider, yielding means supporting the seat upon the wheels, and energy storing means, the energy storing means including a housing rotatably mounted on the rear axle, a spiral spring mounted within the housing, the inner end of the spiral spring being connected to the axle, ratchet means within the housing, the outer end of the spiral spring being connected to the ratchet means, and means responsive to oscillatory movement of the seat supporting the rider for oscillating the housing around the rear axle, means limiting the degree of oscillation of the housing around the rear axle, the ratchet means acting in conjunction with the housing to wind the spring in one direction from the outer end thereof as the housing rotates in one direction and to prevent unwinding of the spring when the housing is stationary or rotating in the opposite direction, the vehicle being driven by energy imparted to at least one of the rear wheels through the axle from the spiral spring.

4. A rider propelled vehicle comprising front and rear wheels, an axle mounting the rear wheels and in driving relation with at least one of the rear wheels, a seat for the rider, yielding means supporting the seat upon the wheels, and energy storing means, the energy storing means including a housing rotatably mounted on the rear axle, a spiral spring mounted within the housing, the inner end of the spiral spring being connected to the axle, a pair of ratchet means concentrically arranged within the housing, the outer end of the spiral spring being connected to one of the pair of ratchet means, and means responsive to oscillatory movement of the seat supporting the rider for oscillating the housing around the rear axle, the one of the pair of ratchet means acting in conjunction with the housing to wind the spring in one direction from the outer end thereof as the housing rotates in one direction and the other of the pair of ratchet means acting to prevent unwinding of the spring when the housing is stationary or rotating in the opposite direction, the vehicle being driven by energy imparted to at least one of the rear wheels through the axle from the spiral spring.

5. A rider propelled vehicle comprising front and rear wheels, an axle mounting the rear wheels and in driving relation with at least one of the rear wheels, a seat for the rider, yielding means supporting the seat upon the wheels, the yielding seat supporting means including a U-shaped spring member having its curved portion forwardly of the vehicle and one of its arms positioned above the other with the rear portion of its upper arm supporting the rider's seat and the rear portion of the lower arm supported by the rear axle, energy storing means mounted on the rear axle and operably connected thereto, means operatively connected to the seat including a generally vertically extending movable link pivotally connected to a generally horizontally extending movable link for transmitting energy produced by oscillating movement of the rider upon the yieldingly supported seat to the energy storing means, and means limiting the amplitude of oscillation of the seat and the links, the vehicle being driven by energy imparted to at least one of the rear wheels from the energy storing means.

References Cited in the file of this patent

UNITED STATES PATENTS

| Number | Name | Date |
|---|---|---|
| 643,525 | Olson | Feb. 13, 1900 |
| 1,632,405 | Harrison | June 14, 1927 |
| 1,798,971 | Clements | Mar. 31, 1931 |
| 1,985,406 | Galkin | Dec. 25, 1934 |
| 2,502,367 | Burnes et al. | Mar. 28, 1950 |

FOREIGN PATENTS

| Number | Country | Date |
|---|---|---|
| 5,492 | Great Britain | of 1897 |
| 510,025 | France | Oct. 20, 1920 |